| United States Patent [19] | [11] Patent Number: 4,564,486 |
|---|---|
| Wherry | [45] Date of Patent: Jan. 14, 1986 |

[54] CURING FIBROUS MINERAL MATERIAL

[75] Inventor: Mark S. Wherry, Granville, Ohio

[73] Assignee: Owens-Corning Fiberglas Corporation, Toledo, Ohio

[21] Appl. No.: 590,594

[22] Filed: Mar. 19, 1984

[51] Int. Cl.⁴ .............................................. B29C 33/72
[52] U.S. Cl. ..................................... 264/39; 264/566; 264/101; 264/136; 264/137; 264/169; 264/236; 264/257; 425/72 R; 425/506; 425/229; 425/343; 425/388; 425/393
[58] Field of Search ................ 264/566, 39, 236, 169, 264/257, 136–137, 121, 101; 425/72 R, 506, 215, 229, 343, 388, 393

[56] References Cited

U.S. PATENT DOCUMENTS

| 3,082,138 | 3/1963 | Hjelt | 264/39 |
|---|---|---|---|
| 3,147,165 | 9/1964 | Slayter | 425/203 |
| 3,201,499 | 8/1965 | Cassé | 264/39 |
| 3,306,958 | 2/1967 | Gidlow | 264/39 |
| 3,427,372 | 2/1969 | Berner | 264/101 |
| 3,497,413 | 2/1970 | Ullman et al. | 425/393 |
| 3,882,211 | 5/1975 | Kamp | 425/464 |
| 3,939,022 | 2/1976 | Lacon . | |
| 4,029,461 | 6/1977 | Lacon . | |
| 4,064,208 | 12/1977 | Hanning | 264/39 |
| 4,115,498 | 9/1978 | Kissell et al. . | |
| 4,124,666 | 11/1978 | Wilhelm et al. | 264/39 |
| 4,181,487 | 1/1980 | Kessler | 425/388 |
| 4,255,109 | 3/1981 | Emmerich et al. | 264/39 |
| 4,307,053 | 12/1981 | Daws et al. . | |

Primary Examiner—Jeffery Thurlow
Attorney, Agent, or Firm—Ronald C. Hudgens; Ted C. Gillespie

[57] ABSTRACT

A curing mold for curing glass fiber pipe insulation contains alternating positive and negative pressure zones and hot curing gases are introduced to the glass fibers during advancement through the positive pressure zones, and the curing gases are exhausted from elongated exhaust openings in the mold during advancement through the negative pressure zones, and the exhaust openings are cleaned without interrupting the advancement of the glass fibers through the curing mold.

8 Claims, 5 Drawing Figures

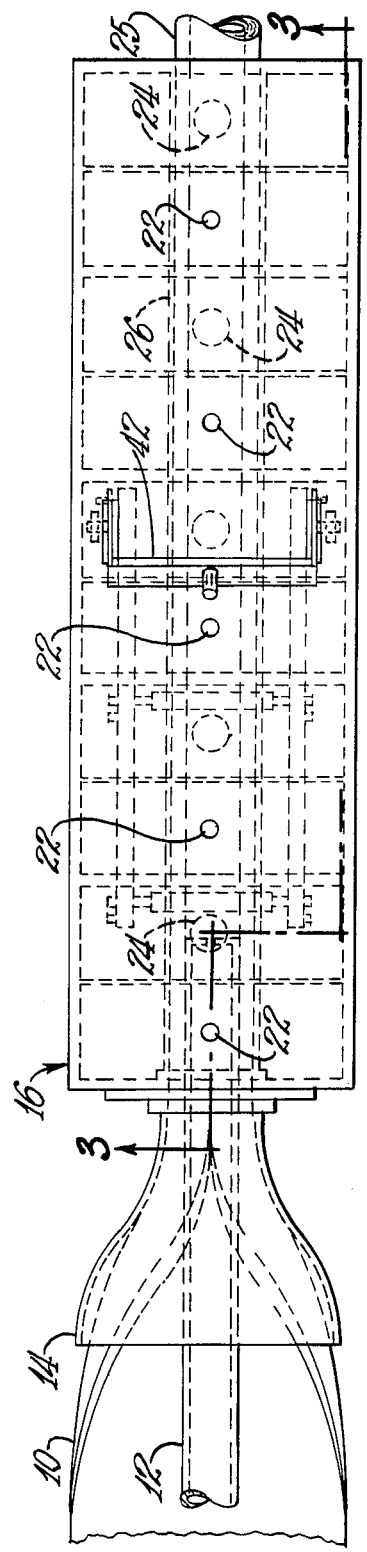
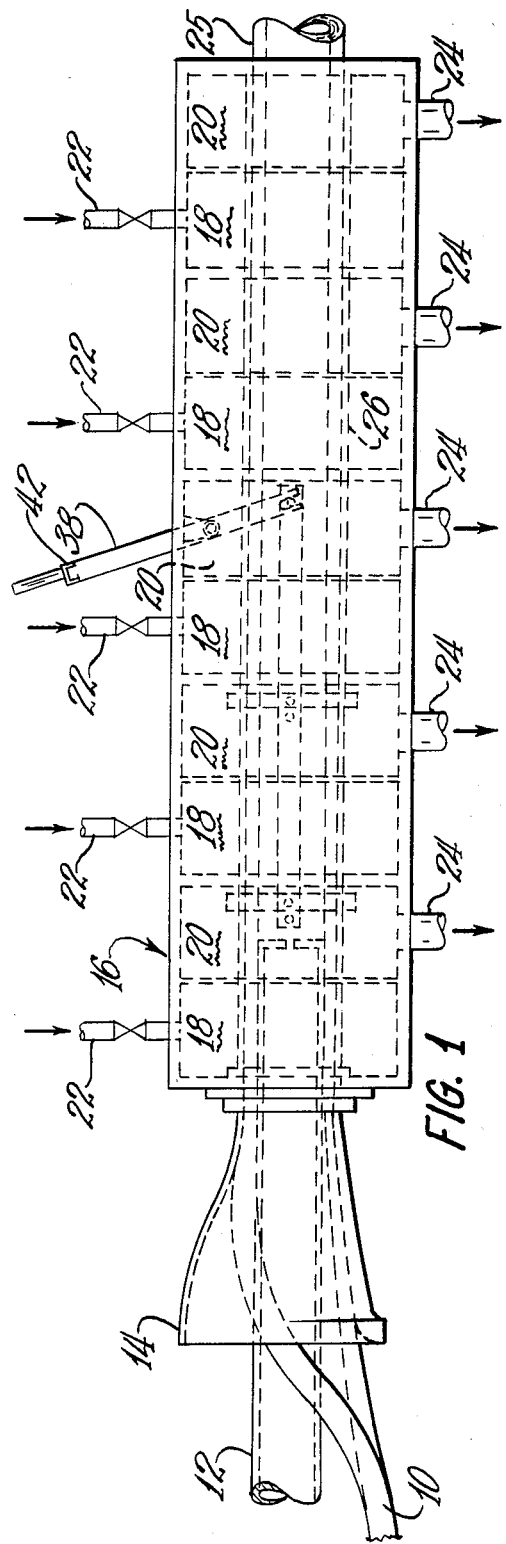

CURING FIBROUS MINERAL MATERIAL

TECHNICAL FIELD

This invention pertains to handling fibrous mineral material, such as fibrous glass insulation material. In one of its more specific aspects this invention relates to passing hot curing gases through the insulation material to cure the binder on the insulation material.

BACKGROUND OF THE INVENTION

One of the methods employed in manufacturing pipe insulation from fibrous mineral material, such as glass wool comprised of glass fibers, is to manufacture a flat pelt of glass wool containing a binder, fold the glass wool into a cylindrical shape, and advance the glass wool through the mold while passing hot curing gases therethrough to cure the binder. Typically, the glass wool is folded around a center mandrel, and this mandrel can be perforated for the passage of hot curing gases from the mandrel into the inside diameter of the pipe insulation. Also, the cylindrical curing mold is typically surrounded by one or more zones of hot curing gases, and the curing mold usually has openings for the passage of curing gases from these zones into the glass wool. The process can be run rather continuously, producing a substantially rigid insulation product.

One of the problems associated with the continuous insulation manufacturing processes of the prior art is that the binder, coming in contact with the hot mold, tends to cure and build up a residue of binder and glass fibers on the surfaces of the mold. A typical binder suitable for use in pipe insulation is a phenol formaldehyde urea binder, which requires temperatures of 400° F. or greater for curing in the mold. In particular, the binder and fibers collect in the openings in the mold which provide communication between the glass wool and the hot gas supply and exhaust zones. Under normal operating conditions, these curing molds require shutdown and substantial disassembly for cleaning of fiber and binder residue from the holes in the mold wall, thereby greatly reducing the efficiency of the machines. The frequency of these required cleanings is usually in the range of from about 1 to about 4 hours. There is a need for a method and apparatus for cleaning pipe insulation molds without interrupting the continuous molding process.

SUMMARY OF THIS INVENTION

The apparatus and method of this invention are directed toward solution of the above problem by providing openings in the mold wall which are slots, rather than holes, and providing a moveable member, such as a pin, for cleaning out the slot during the molding process.

According to this invention, there is provided apparatus for curing fibrous mineral material comprising a curing mold through which is advanced the material containing uncured binder thereon, alternating positive and negative pressure zones through which the material passes as the material is advanced through the mold, inlet openings in the walls of the mold for introducing curing gases into the material during advancement through the positive pressure zones, exhaust openings in the mold for exhausting curing gases from the material during advancement through the negative pressure zones, and means for cleaning the exhaust openings without interrupting the advancement of the material through the mold. The means for cleaning the mold can enable the continuous molding process to continue for longer periods of time than have been previously possible.

The primary thrust of this new apparatus is the means for cleaning the exhaust openings, which are associated with the negative pressure zones, because this is where the greatest build up of binder and fibers occurs. In practice, the inlet openings, being associated with the positive pressure zones, are not as greatly affected by the build up of binder and fibers as are the exhaust openings. This is not to say, however, that the means for cleaning of the invention could not be applied to the inlet openings also. The use of the invention has resulted in a reduction of the frequency of the required cleanings to within the range of 2 to 4 days.

In a specific embodiment of the invention the exhaust openings are elongated slots. In a preferred embodiment of the invention the means for cleaning comprises a plurality of members, such as pins positioned within the elongated slots, with each of the pins being mounted for movement within one of the elongated slots for the cleaning of the slots.

In a preferred embodiment of the invention, the elongated slots are oriented lengthwise in the direction of the advancement of the material.

In a most preferred embodiment of the invention, the pins in the elongated slots in at least two of the negative pressure zones are interconnected for substantially simultaneous cleaning.

In the most preferred embodiment of the invention, the curing mold is cylindrical for manufacturing pipe insulation.

According to this invention, there is also provided a method for manufacturing pipe insulation from fibrous mineral material comprising advancing the material containing uncured binder thereon through a cylindrical curing mold, where the advancement of the material through the mold moves the material through alternating positive and negative pressure zones, introducing curing gases from said positive pressure zones through inlet openings in the walls of said mold into the material, exhausting curing gases from the material to said negative pressure zones through elongated slots in said mold during advancement through said negative pressure zones, and cleaning said elongated slots without interrupting the advancement of the material through said mold.

DESCRIPTION OF THE DRAWINGS

FIG. 1 is a schematic view in elevation of apparatus for curing fibrous mineral material according to the principles of this invention.

FIG. 2 is a schematic plan view of the apparatus of FIG. 1.

DESCRIPTION OF THE INVENTION

Figure 3:
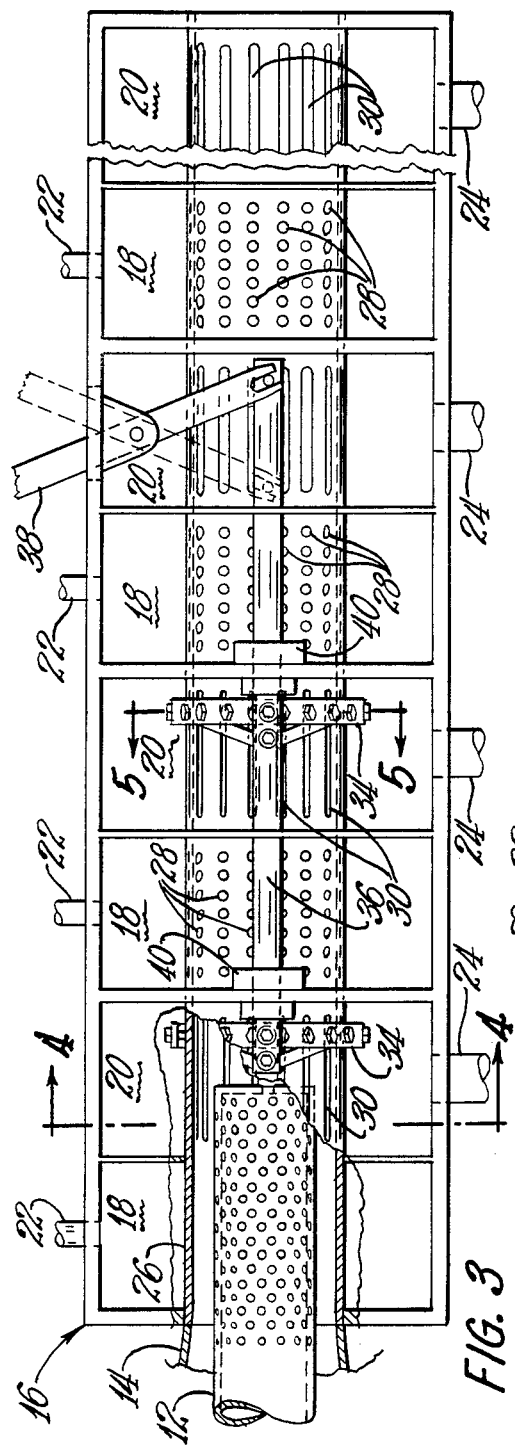
FIG. 3 is a schematic cross-sectional view in elevation of the curing apparatus.

It is to be understood that although the invention is herein described using glass fiber cylindrically shaped pipe insulation as an example, other fibrous mineral material, such as fibers of rock, slag or basalt, can be employed, and that shapes other than cylindrical shapes can be molded using the method and apparatus of this invention.

As shown in FIGS. 1 and 2, glass wool pelt 10 which contains uncured binder, is folded around mandrel 12 by folding shoe 14. The mandrel forms the inside diameter of the pipe insulation and preferably extends into the first several zones of the curing chamber. The mandrel can be provided with openings and supplied with hot curing gases fur curing the inside diameter of the pipe insulation. Folding shoes are well known in the art, and any shoe suitable for folding the glass wool into the desired ultimate shape can be used for purposes of the invention.

Once folded, the glass wool is advanced through curing chamber 16 having positive pressure zones 18 and negative pressure zones 20. The positive pressure zones can be supplied with hot curing gases, suitable for curing the binder on the glass wool, via any suitable means, such as inlet ducts 22. The negative pressure zones can be exhausted by any suitable means, such as exhaust ducts 24. Typically, the pressure in the positive pressure zones is approximately 1 psig, and the pressure in the negative pressure zones is approximately $-1$ psig. After curing, pipe insulation 25 emerges from the curing chamber.

As shown schematically in FIG. 3, positioned within the curing chamber is curing mold 26, which defines the outside dimension of the glass wool. For the production of pipe insulation, the curing mold is cylindrical. The curing mold is adapted with openings to provide access for the flow of hot gases from the positive pressure zones to the glass wool and from the glass wool to the negative pressure zones. In the positive pressure zones, these openings are inlet openings 28, which enable the hot curing gases to flow from the positive pressure zones into the glass wool. Although these openings are shown as being holes, they can be of any other shape suitable for the flow of hot gases into the glass wool.

Exhaust openings 30 are positioned in the curing mold for the portions of the curing mold within the negative pressure zones. Preferably, these exhaust openings are elongated slots. Most preferably, the elongated slots are oriented lengthwise in the direction of advancement of the material. For the manufacture of pipe insulation, the slots are preferably parallel with the axis of the mold. The exhaust openings can be any openings suitable for exhausting the curing gases from the glass wool as the glass wool advances through the negative pressure zones. The path of curing gases is from the positive pressure zones into the glass wool through the inlet openings, then along part of the length of the glass wool to the elongated slots, and finally, through the elongated slots into the negative pressure zones.

Figure 5:
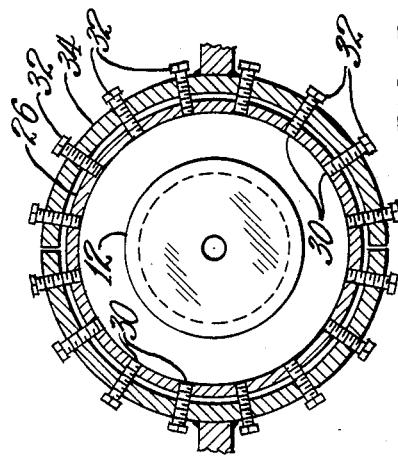
FIG. 5 is a schematic view in elevation taken alone line 5—5 of FIG. 3.
Figure 4:
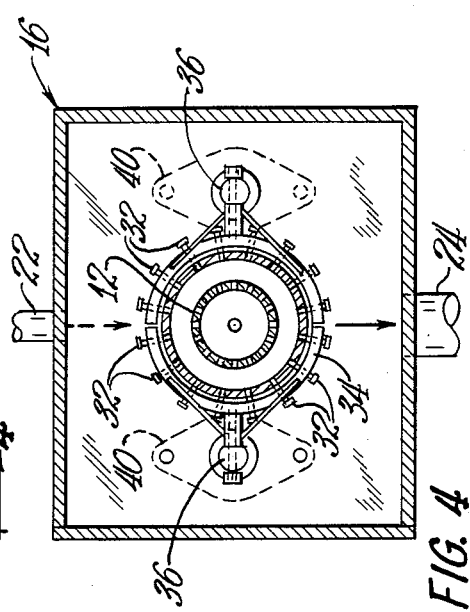
FIG. 4 is a schematic view in elevation taken along line 4—4 of FIG. 3.

While the elongated slots themselves provide a larger opening than the holes in the positive pressure zones, and would therefore exhibit a lower rate of binder and fiber build up, the slots are provided with a plurality of slot-cleaning members, such as pins 32, mounted for movement within the elongated slots. The pins can be any member capable of being positioned within the elongated slots and moved to dislodge the built-up binder and glass fibers without interrupting the flow of glass wool through the mold. As shown in FIGS. 4 and 5, the pins can be mounted on collar 34 for simultaneous movement and cleaning of all the slots in a particular negative pressure zone. The collar can be any means suitable for mounting the pins.

As shown in the drawings, the pins can be provided for the slots in the first two negative zones in a multi-zone curing chamber. It has been found that subsequent to the first two negative zones, the binder has undergone sufficient curing to be rigid, thereby avoiding the problem of binder and fiber build up in the openings. It is to be understood, however, that the pins can be provided in any number of the negative pressure zones in specific curing chambers.

As shown in FIG. 3, the collar, and thus the pins, can be linked via guide rods 36 to manually operated actuating lever 38 for movement of the pins within the slots. In the preferred embodiment, the guide rods are mounted in bearings 40 to facilitate movement of the collar. Also, preferably, the actuating lever consists of split yoke 42 as the link to the two guide rods. Any means suitable for moving the collar and pins will be sufficient and will be within the understanding of those skilled in the art. The collars, and therefore the pins, in two of the negative pressure zones can be interconnected, as shown in FIG. 3, so that substantially simultaneous cleaning occurs by the movement of the actuating lever.

It will be evident from the foregoing that various modifications can be made to this invention. Such, however, are considered as being within the scope of the invention.

INDUSTRIAL APPLICABILITY

This invention will be found useful in the manufacture of pipe insulation products, such as pipe insulation made from glass fibers.

I claim:

1. Apparatus for curing fibrous mineral material comprising a curing mold through which is advanced the material containing uncured binder thereon, alternating positive and negative pressure zones through which the material passes as the material is advanced through said mold, inlet openings in the walls of said mold for introducing curing gases into the material during advancement through said positive pressure zones, elongated slots in said mold for exhausting curing gases from the material during advancement through said negative pressure zones, and a plurality of members positioned within said elongated slots, said members being mounted for movement within said elongated slots for cleaning said elongated slots without interrupting the advancement of the material through said mold.

2. The apparatus of claim 1 in which said elongated slots are oriented lengthwise in the direction of the advancement of the material.

3. The apparatus of claim 2 in which said members are interconnected for substantially simultaneous cleaning of said elongated slots in at least two of said negative pressure zones.

4. Apparatus for manufacturing pipe insulation from fibrous mineral material comprising a cylindrical curing mold through which is advanced the material containing uncured binder thereon, alternating positive and negative pressure zones through which the material passes as the material is advanced through said mold, inlet openings in the walls of said mold for introducing curing gases into the material during advancement through said positive pressure zones, elongated slots in said mold for exhausting curing gases from the material during advancement through said negative pressure zones, said elongated slots being oriented in parallel with the axis of said mold, and pins positioned within said elongated slots for cleaning said elongated slots without interrupting the advancement of the material through said mold.

5. The apparatus of claim 1 in which said pins are interconnected for substantially simultaneous cleaning of said elongated slots in at least two of said negative pressure zones.

6. The method for manufacturing pipe insulation from fibrous mineral material comprising advancing the material containing uncured binder thereon through a cylindrical curing mold, where the advancement of the material through the mold moves the material through alternating positive and negative pressure zones, introducing curing gases from said positive pressure zones through inlet openings in the walls of said mold into the material, exhausting curing gases from the material to said negative pressure zones through elongated slots in said mold during advancement through said negative pressure zones, and cleaning said elongated slots without interrupting the advancement of the material through said mold by moving pins along said elongated slots.

7. The method of claim 6 in which the elongated slots in one of said negative pressure zones are cleaned substantially simultaneously.

8. The method of claim 7 in which the elongated slots in at least two said negative pressure zones are cleaned substantially simultaneously.

* * * * *